United States Patent [19]
Andrews

[11] Patent Number: 4,525,041
[45] Date of Patent: Jun. 25, 1985

[54] ARRANGEMENT FOR USE IN POSITIONING AN OPTICAL IMAGE

[75] Inventor: Stanley W. Andrews, Worcester Park, England

[73] Assignee: Precision Grinding Limited, Surrey, England

[21] Appl. No.: 468,848

[22] Filed: Feb. 22, 1983

[30] Foreign Application Priority Data

Feb. 24, 1982 [GB] United Kingdom ............... 8205480

[51] Int. Cl.³ .............................................. G05D 1/02
[52] U.S. Cl. .................................................. 350/484
[58] Field of Search .............. 350/287, 484, 286, 421, 350/252

[56] References Cited

U.S. PATENT DOCUMENTS 3,776,995 12/1973 Little, Jr. .............................. 350/484

OTHER PUBLICATIONS

Jenkins et al., *Fundamentals of Optics*, McGraw-Hill, 1957, 3rd Ed. pp. 19–20.

Primary Examiner—Bruce Y. Arnold
Attorney, Agent, or Firm—Laff, Whitesel, Conte & Saret

[57] ABSTRACT

An arrangement for use in positioning an optical image with respect to an optical axis includes a plane optical element which is tiltable through rotation of a first rotatable ring member to deflect an image on the axis in a first plane which includes the axis and a second plane optical element which is tiltable through rotation of a second rotatable ring member to deflect the image in a second plane which includes the axis and is at an angle to the first plane.

2 Claims, 2 Drawing Figures

ARRANGEMENT FOR USE IN POSITIONING AN OPTICAL IMAGE

The invention relates to an arrangement for use in positioning an optical image.

It is frequently necessary when viewing an object through an optical instrument, for example a microscope or a telescope, to arrange that the image viewed appears in a particular position relative to the transverse X and Y axes of the instrument.

The field of view of instruments used in certain applications incorporates a reticule or a graticule and the accurate determination of any movement of the object during a period of time is made more easy if the image of the object is first arranged in a given position relative to the reticule or graticule.

The present invention provides a simple method of positioning an image relative to the transverse axes of an instrument thereby enabling such movements to be more accurately determined.

Figure 1:
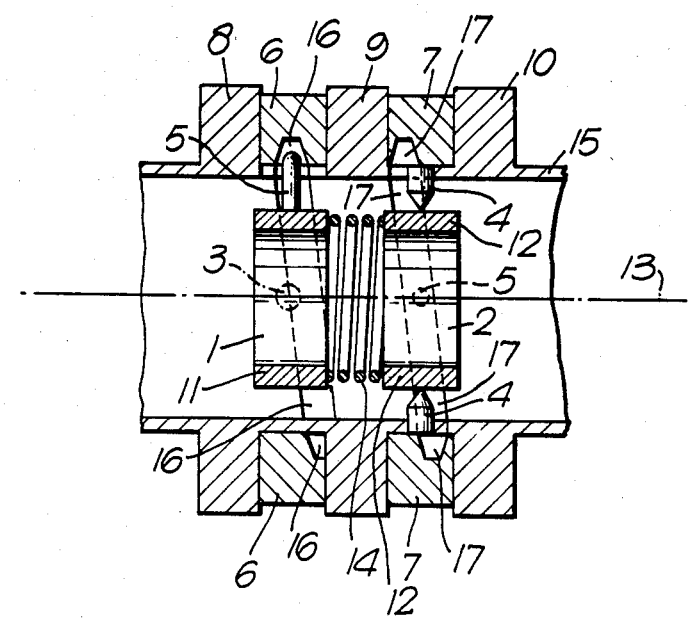
Figure 2:
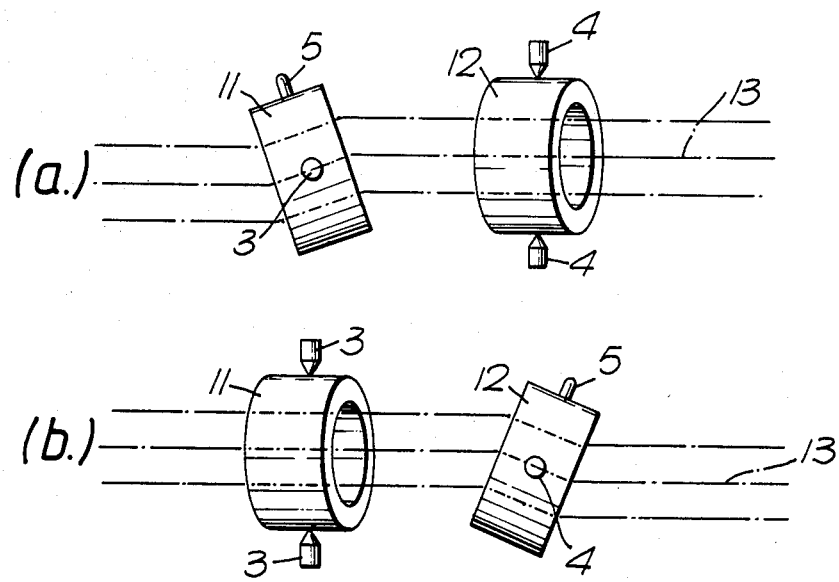

An embodiment of the present invention will now be described by way of example with reference to the accompanying drawings in which FIG. 1 is a longitudinal section through a part of the optical system of a microscope and FIG. 2 shows at (a) and (b) diagrammatic illustrations of the essential parts of the system.

Referring now to FIG. 1 there is shown a section through an arrangement which forms a part of the optical system of a microscope. The system may, for example, form a part of the microscope 28 shown in the specification of UK Pat. No. 844,143, the disclosure of which is incorporated herein by reference, although its use is not limited to such an application.

The arrangement shown in FIG. 1 makes possible the accurate setting of an optical image, for example a microscope image or a projected microscope image, in both the X and the Y axes of an optical system in relation to a reticule or a graticule placed within the optical system, which may for example be that of a microscope or a microscope projector, and it can, when set, be used to observe any wear or maladjustment of a trimming tool in the machine described in the above numbered UK patent specification.

The arrangement shown in FIG. 1 can be used to pre-position an image before making measurements with a co-ordinate measuring system, or it can be used, for example, to relate an image to a pre-determined datum location for a microscope or a projector.

In FIG. 1 there are shown two optical elements in the form of planes 1 and 2 which are arranged in respective mounts 11 and 12 and are pivotally supported on respective pairs of bearings 3 and 4. The bearings 3 and 4 extend from the inner wall of a tubular housing 15. The outer wall of the housing 15 is formed with three outwardly extending annular abutments 8, 9 and 10. Between the abutments 8 and 9 there is a freely rotatable ring 6 and between the abutments 9 and 10 there is a freely rotatable ring 7. The rings 6 and 7 each incorporate a respective inner helical groove section 16 and 17. The optical planes 1 and 2 are positioned in the light path of the microscope about the longitudinal axis 13 and each has an extension in the form of a pin 5 which is rigidly connected to the respective mount 11 or 12 and extends through corresponding slots in the housing 15 into the respective helical groove 16 or 17. It will be noted that the bearings 3 and 4 are arranged at 90° to the axis 13 of the microscope and at 90° to each other. Similarly, the pin 5 for the mount 11 is arranged to extend at right-angles to the pin 5 for the mount 12. The optical plane 1 and 2, together with their respective mounts 11 and 12, are biassed by means of a spring 14 placed between their adjacent surfaces to bring the extension pins 5 into firm contact with the flanks of the respective helical grooves 16 and 17 in the rings 6 and 7.

It will be appreciated that, in operation, the action of rotating either the ring 6 or the ring 7 about the axis 13 of the microscope causes either the optical plane 1 or the optical plane 2 to tilt as a result of the movement of the respective pin 5 in the helical groove and in so doing to displace the optical light path as a result of refraction. By means of this simple movement of either of the optical planes, it is possible to provide a quick and positive adjustment of the optical axis of the microscope in either the X or Y axes or in the resultant of a movement of both of them. This positioning arrangement, when used with a machine of the type described in the above-numbered United Kingdom patent specification, enables the optical axis of the viewing microscope 28, shown in the patent specification, to be brought in a very simple way into coincidence with the axis of a hollow cylindrical pivot post 16 about which a trimming tool 24 shown in the specification pivots.

Referring to FIG. 2 there are shown, in diagrammatic form, the essential parts of the arrangement illustrated in FIG. 1. The view shown at (a) in FIG. 2 is taken from a side of the arrangement and illustrates the effect of tilting the optical plane 1 about the pivots 3 upon the light path passing through the microscope. It will be seen that, as a result of refraction, the light path is moved sideways relative to the path which it takes through the plane 2.

At (b) in FIG. 2 there is shown a view taken from the side of the arrangement, but at 90° with respect to the view shown at (a) in FIG. 2. In the arrangement shown at (b) the plane 1 has not been moved and the plane 2 has been tilted about the pivots 4. In this arrangement, the optical path has been moved sideways with respect to the path passing through the plane 1 and at an angle of 90° to the movement shown at (a) in FIG. 2.

It will be seen that by tilting both of the planes it is possible to move the light path in a combination of movements in both the X and the Y axes, so that it can be positioned quickly and easily with respect to a reference, whereas the tilting of only one of the planes in the arrangement shown results in the movement of the light path along only one transverse axis. It may be noted that the direction in which one plane is tilted need not be at 90° with respect to the direction in which the other plane is tilted. Thus, with respect to the embodiment described, the axes of the pivot bearings 3 and 4 need not be arranged to be at 90° to one another.

It is furthermore within the scope of the invention to employ only one tiltable optical element, the axis of the pivot bearings for the element being rotatable about the optical axis of the system, thereby enabling the direction in which the refracted light path is displaced to be varied with the rotation of the element and the amount of the displacement to be varied with variations in the angle of tilt. Such an arrangement may be achieved, for example, by making the housing 15 rotatable about the axis 13.

In such an arrangement only one of the plane optical elements 1 or 2 is required, the degree of tilt of the element being controlled by the rotation of either the ring 6 or the ring 7 and the direction of the deflection of a beam impinging on the optical plane being controlled by the degree of rotation of the optical plane about the axis 13 as a result of the rotation of the housing 15.

It will also be appreciated that the invention is not limited to the use of plane optical elements. An optical element may be in some other form, for example a lens or a mirror, as appropriate.

It will also be appreciated that although a particular arrangement has been shown for carrying out this adjustment, the movements of the optical planes 1 and 2 can be achieved by other means.

It will also be appreciated that although particular arrangements have been shown having features which are particularly suitable for use with a machine of the type described in the above-numbered UK patent specification, the various features of the arrangement described can be applied either individually or together in other ways and to other machines.

I claim:

1. An arrangement for use in positioning an optical image with respect to an optical axis, said arrangement including first and second optical elements arranged on the optical axis, first and second pivotal mounting means for pivotally mounting the first and second optical elements to turn about first and second axes respectively, the first and second axes being positioned at right angles to each other and perpendicular to the optical axis, first and second rotatable ring members which are turned about the optical axis, means for respectively coupling the first pivotal mounting means to the first rotatable ring member and for coupling the second pivotal mounting means to the second rotatable ring member whereby a rotation of the first rotatable ring member causes the first mounting means and the first optical element to be tilted about the first of the axes and a rotation of the second rotatable ring member causes the second mounting means and the second optical element to be tilted about the second of the axes.

2. An arrangement as claimed in claim 1 wherein said first and second rotatable ring members have inner surfaces and further said coupling means including first and second bearing members respectively, extending from the first and second mounting means at right angles to the respective first and second axes, and means defining a helical groove in the inner surface of each of the first and second rotatable ring members respectively, the first bearing member extending into the groove in the first rotatable ring member and the second bearing member extending into the groove in the second rotatable ring member.

* * * * *